No. 765,565.                                               Patented July 19, 1904.

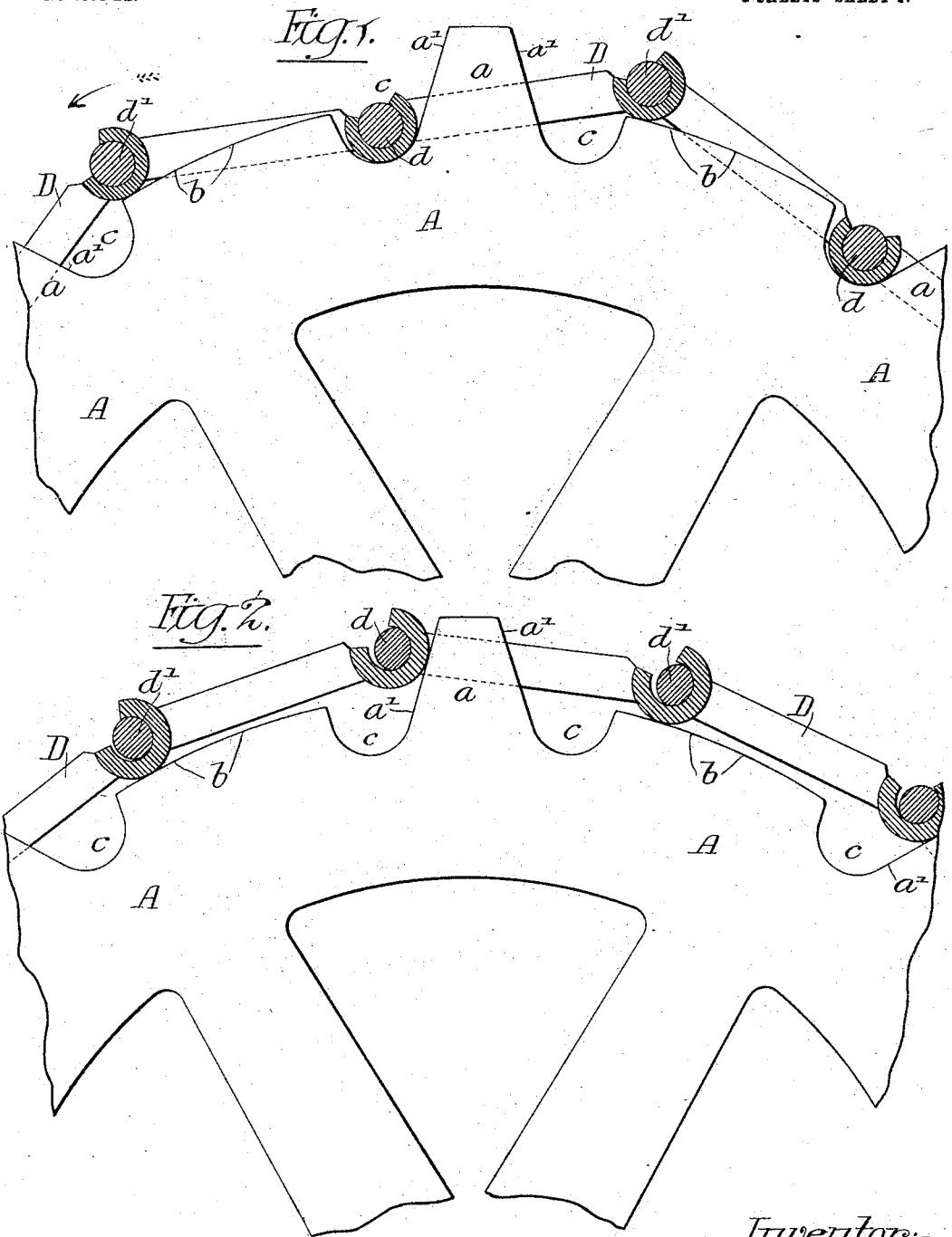

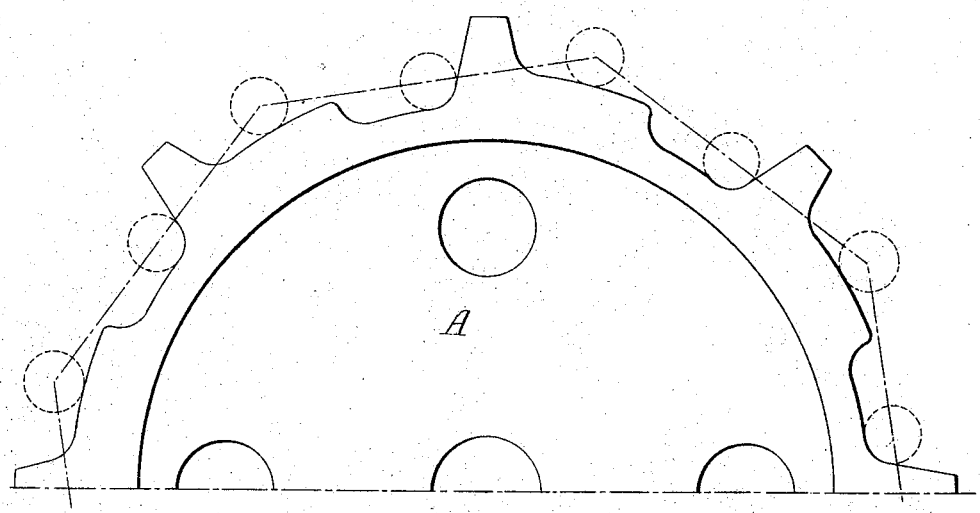

UNITED STATES PATENT OFFICE.

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

CHAIN AND SPROCKET GEARING.

SPECIFICATION forming part of Letters Patent No. 765,565, dated July 19, 1904.

Application filed September 13, 1901. Serial No. 75,298. (No model.)

*To all whom it may concern:*

Be it known that I, JAMES M. DODGE, a citizen of the United States, residing in Philadelphia, Pennsylvania, have invented certain Improvements in Chain and Sprocket Gearing, of which the following is a specification.

The object of my invention is to so construct a sprocket-wheel for drive-chains that chains having different pitch may be applied to the same sprocket-wheel, thereby dispensing with the usual practice of accurately fitting each chain-link to the wheel; and a further object of the invention is to so construct the sprocket-wheel that as the chain wears the slack will be automatically taken up by the chain shifting its position on the teeth of the sprocket-wheel.

In the accompanying drawings, Figure 1 is a view of a portion of a reversible sprocket-wheel, illustrating my invention and showing a new chain in position. Fig. 2 is a view similar to Fig. 1, showing a chain with elongated pitch; and Fig. 3 is a view of a sprocket-wheel shaped to run in one direction only.

Referring in the first instance to Fig. 1, A is a wheel having teeth $a$, with inclined sides $a'$. Between the teeth $a$ are platforms $b$, on which the joints of the links of the chain rest, and between each platform and each link are recesses $c$ for the intervening joints of the chain, as clearly shown in Fig. 1. Each platform is substantially at a right angle to a radial line drawn from the center of the wheel, and, as shown in the drawings, I prefer to make the surface of the platform on a circular arc.

D is the drive-chain, in the present instance of the "Ewart" detachable-link type, having joints $d$ and $d'$, formed by a pin on one link and a socket in an adjoining link.

When the chain is new, it is fitted to the sprocket-wheel, as indicated in Fig. 1, and when the wheel is turned in the direction of the arrow the chain will be driven by the side walls $a'$ of the teeth $a$ of the sprocket-wheel bearing against the joints $d$ of the chain, while the joints $d'$ rest upon the platforms between the teeth. When in this position, a straight line drawn from the center of one joint $d'$ to the other joint $d'$ will pass through the center of the joint $d$, so that when the chain is seated on the wheel there is no sliding motion of the chain upon the tooth as the wheel is rotated. When the chain wears, the pitch will be elongated and the slack of the chain will be automatically taken up by the joints $d$ riding up the inclined surfaces $a'$ of the teeth $a$, thus increasing the pitch diameter, so that after considerable wear the chain will assume the position shown in Fig. 2 of the drawings.

It will be seen that while the joints $d'$ bear upon the platforms between the teeth the joints $d$ will assume a position a considerable distance beyond the line drawn from the center of one joint $d'$ to the other.

The chain can wear until the joints $d\ d'$ are extended so far that a line drawn from the center of one joint $d$ to another joint $d$ will cut through the center of the joint $d'$, when the chain should be discarded.

In Fig. 3 I have shown a wheel arranged with a platform adjacent to one side of the tooth. This form of wheel is intended to drive only in one direction, being a modification of the wheel shown in Fig. 1.

I claim as my invention—

The combination of a sprocket-wheel having teeth and platforms alternating with the teeth, each platform being on an arc of a circle taken from the center of the wheel, with a drive-chain consisting of a series of open links, the bar of one link resting in the socket of an adjoining link, the sockets of the alternate links being in contact with the teeth of the wheel while the sockets of the other links rest upon the platforms, so that as the chain wears the pitch-line of the alternate links will move farther from the center of the wheel, substantially as described.

In testimony whereof I have signed my name to this specification in the presence of two subscribing witnesses.

JAMES M. DODGE.

Witnesses:
 WILL A. BARR,
 JOS. H. KLEIN.